(12) United States Patent  (10) Patent No.: US 8,372,170 B2
Woods et al.  (45) Date of Patent: Feb. 12, 2013

(54) FUEL STEAM REFORMER SYSTEM AND REFORMER STARTUP PROCESS

(75) Inventors: Richard Root Woods, Irvine, CA (US); Brook Forest Porter, Playa Vista, CA (US); Kandaswamy Duraiswamy, Huntington Beach, CA (US)

(73) Assignee: Intelligent Energy, Inc., Long Beach, CA (US)

( * ) Notice: Subject to any disclaimer, the term of this patent is extended or adjusted under 35 U.S.C. 154(b) by 0 days.

(21) Appl. No.: 12/687,625

(22) Filed: Jan. 14, 2010

(65) Prior Publication Data
US 2010/0172827 A1 Jul. 8, 2010

Related U.S. Application Data

(63) Continuation of application No. 11/534,822, filed on Sep. 25, 2006, now Pat. No. 7,670,587.

(60) Provisional application No. 60/781,614, filed on Mar. 10, 2006.

(51) Int. Cl.
*B01J 8/00* (2006.01)

(52) U.S. Cl. ............ 48/127.9; 48/61; 422/625

(58) Field of Classification Search ..... 48/197 R–197 A, 48/127.1; 422/129–242; 429/400–535
See application file for complete search history.

(56) References Cited

U.S. PATENT DOCUMENTS

| | | | |
|---|---|---|---|
| 5,686,196 | A | 11/1997 | Singh et al. |
| 6,348,278 | B1 | 2/2002 | LaPierre et al. |
| 6,627,342 | B1 | 9/2003 | Nakamura et al. |
| 7,670,587 | B2 * | 3/2010 | Porter et al. ........ 423/652 |
| 2002/0114984 | A1 | 8/2002 | Edlund et al. |
| 2003/0046867 | A1 | 3/2003 | Woods et al. |
| 2004/0101720 | A1 * | 5/2004 | Ogawa ................ 429/20 |
| 2005/0112056 | A1 | 5/2005 | Hampden-Smith et al. |
| 2005/0191534 | A1 | 9/2005 | Kim et al. |
| 2005/0281735 | A1 | 12/2005 | Chellappa |
| 2005/0287409 | A1 | 12/2005 | Reinke et al. |

FOREIGN PATENT DOCUMENTS

| | | |
|---|---|---|
| EP | 1468722 | 10/2004 |
| WO | WO 03/031047 | 4/2003 |

* cited by examiner

*Primary Examiner* — Imran Akram
(74) *Attorney, Agent, or Firm* — BakerHostetler, LLP; Mark H. Krietzman

(57) ABSTRACT

A hydrogen generation system is disclosed that has a vaporization section receiving and vaporizing fuel along with water and passing the vapor to a reformer catalyst section heated by a combustor section which generates reformate gas and is fueled by off-gas from a $H_2$ purification unit along with a combustion air source. The off-gas outlet feeds the combustor section in the reformer assembly to heat the catalyst section and the vaporization section. An $H_2$ storage unit connected to the $H_2$ purification unit pure $H_2$ outlet receives the pure $H_2$. The storage unit has an outlet selectively connectable to the reformer assembly process inlet during startup without the need for a spark igniter. The startup process includes generating heat in the combustor section of the reformer assembly by passing $H_2$ from the $H_2$ storage unit through the vaporization section, the reformer catalyst section, the $H_2$ purification unit and through the off-gas connection to the combustor section, then introducing water and fuel through the vaporization section and reformer catalyst section to generate reformate gas when the system is warmed, passing the reformate gas through the $H_2$ purification unit to the off-gas connection to the combustor section, and establishing a back pressure on the reformer catalyst section and vaporizer section to decrease the hydrogen flow from the $H_2$ storage unit until the system is fully sustainable without addition of $H_2$ from the $H_2$ storage unit.

7 Claims, 3 Drawing Sheets

FUEL STEAM REFORMER SYSTEM AND REFORMER STARTUP PROCESS

RELATED APPLICATION

This application is a Continuation Application and claims the Paris Convention Priority of U.S. Utility application Ser. No. 11/534,822 U.S. Pat. No. 7,670,587, entitled "FUEL STEAM REFORMER SYSTEM AND REFORMER STARTUP PROCESS," filed on Sep. 25, 2006 and issued on Mar. 2, 2010, which claims the priority to U.S. Provisional Application Ser. No. 60/781,614, filed Mar. 10, 2006, the contents of which are incorporated by reference herein in their entirety.

BACKGROUND

1. Field

This disclosure relates generally to a startup procedure for hydrocarbon fuel reformers or fuel processing systems.

2. Description of Related Art

A hydrogen generation subsystem consists of a reformer, hydrogen purification unit and process support components such as valves, sensors, and regulators. Reformers are devices that convert a fuel stream into a hydrogen rich stream. These hydrogen rich streams can also contain gases such as carbon dioxide, carbon monoxide, nitrogen, water vapor, methane, and other gases depending on the composition of the fuel. High temperature gas phase reformers can be of several types including steam reformers, autothermal reformers, and partial oxidation reformers, and hybrids of these reformers. In general, steam reformers use steam to react with the fuel, while autothermal reformers use steam and oxygen, and partial oxidation reformers use only oxygen.

A steam reformer consists of a reform catalyst bed in thermal communication with a combustion source such that heat form the combustor is transferred from the combustion reactions into the reformer catalyst to support the endothermic steam reforming reaction. These systems can be large industrial scale or compact units design for direct integration with a down stream hydrogen use application.

The process of steam reforming has been in industrial practice for over a hundred years and in general several techniques are well known to prevent undesired reactions. These techniques include the following: 1) the addition of excess steam or maintaining the steam to carbon ratio as high as practical based on the thermal efficiency, available reactant supplies, and system complexity that are acceptable; 2) maintaining a hydrogen gas recycle loop within the process; 3) selecting catalyst systems that promote the desired reactions; 4) selecting piping and vessel materials that do not promote the undesired reactions on internal surfaces; 5) operating the reforming process at a steady state condition to maintain a properly designed thermal and pressure profile within the catalyst sections; 6) eliminating or minimizing process transients which can upset the balanced thermal and pressure profiles; 7) establishing a lower temperature pre-reforming section to controllably create a hydrogen rich environment and decrease the average length and/or complexity of the feed compounds prior to the high temperature reform section; and 8) others.

A fuel cell power generator is an example of an application in which compact units are used. In these applications, the fuel cell power generator and therefore the hydrogen generation subsystem and the reformer, may be required to cycle on and off depending on the application and specific load characteristics. This start and stop type operation imposes difficult conditions on the reformer system and can cause unacceptable side reactions. One such side reaction is the formation of solid carbon, which can be due to various reasons including low steam concentrations, cold temperatures, and high pressure prior to reaching stable operating profiles. This is especially true during the startup phase of operation. What is needed is a hydrogen generation system configuration and operating protocol which minimizes the conditions most likely to result in the formation of solid carbon.

SUMMARY

According to an exemplary implementation, a system configuration and startup procedure for minimizing the potential for solid carbon formation in a compact hydrogen generation system is disclosed. The hydrogen generation system configuration basically comprises a fuel vaporization section that vaporizes water and fuel and mixes it with a recirculating flow of hydrogen. The vaporization section is connected to a fuel reformer connected to a reformate purification unit, which is, in turn, connected to a hydrogen storage unit, which supplies the hydrogen flow to the vaporization section. The fuel reformer has a reform catalyst section and a combustor section. In the combustor section a portion of the hydrogen is mixed with air and (catalytically) combusted to create heat used to increase the temperature of the reformer's reform catalyst section. The startup procedure comprises the initiation of hydrogen flow from the storage unit, directing the hydrogen flow through the fuel reformer's reform catalyst section after which it flows into the hydrogen purification unit, where it is directed to the reformer's combustor section.

In other words, a hydrogen generation system in accordance with the disclosure includes a reformer assembly having a process inlet for receiving a fuel and produces a reformate gas therein. The reformer assembly includes a vaporization section receiving and vaporizing the fuel along with water and passing the vapor to a reformer catalyst section that is heated by a combustor section fueled by the off-gas from the $H_2$ purification unit along with a combustion air source. An $H_2$ purification unit receives the reformate gas from the reformer assembly and separates pure $H_2$ from the reformate gas. The $H_2$ purification unit has a pure $H_2$ outlet and an off-gas outlet. An $H_2$ storage unit is connected to the $H_2$ purification unit's pure $H_2$ outlet for receiving the pure $H_2$, and, in turn, the $H_2$ storage unit has an outlet that is selectively connectable to the reformer assembly process inlet during startup operation of the system.

The startup process preferably comprises operations of:

generating heat in the combustor section of the reformer assembly by passing $H_2$ from the $H_2$ storage unit through the vaporization section, the reformer catalyst section, the $H_2$ purification unit and through the off-gas connection to the combustor section;

introducing water and fuel through the vaporization section and reformer catalyst section to generate reformate gas;

passing the reformate gas through the $H_2$ purification unit to the off-gas connection to the combustor section; and establishing a back pressure on the reformer catalyst section and vaporizer section to decrease the hydrogen flow from the $H_2$ storage unit until no further demand of $H_2$ from the storage unit is required. At this point, stable normal operation of the system has been achieved, and is then maintained without supplemental hydrogen. The hydrogen utilized during startup is then replenished to the $H_2$ storage unit while hydrogen is supplied to downstream applications as may be required. This system configuration and startup process eliminates any need for spark ignition, burners, or other heating mechanisms, thus simplifying the overall system design and operation.

Other features and advantages of the present disclosure will be set forth, in part, in the descriptions which follow and the accompanying drawings, wherein preferred embodiments and some exemplary implementations of the present disclosure are described and shown, and in part, will become apparent to those skilled in the art upon examination of the following detailed description taken in conjunction with the accompanying drawings.

DRAWINGS

DETAILED DESCRIPTION

The present disclosure relates to a hydrogen generation system and startup procedure to minimize the potential for carbon formation during startup.

Figure 1:
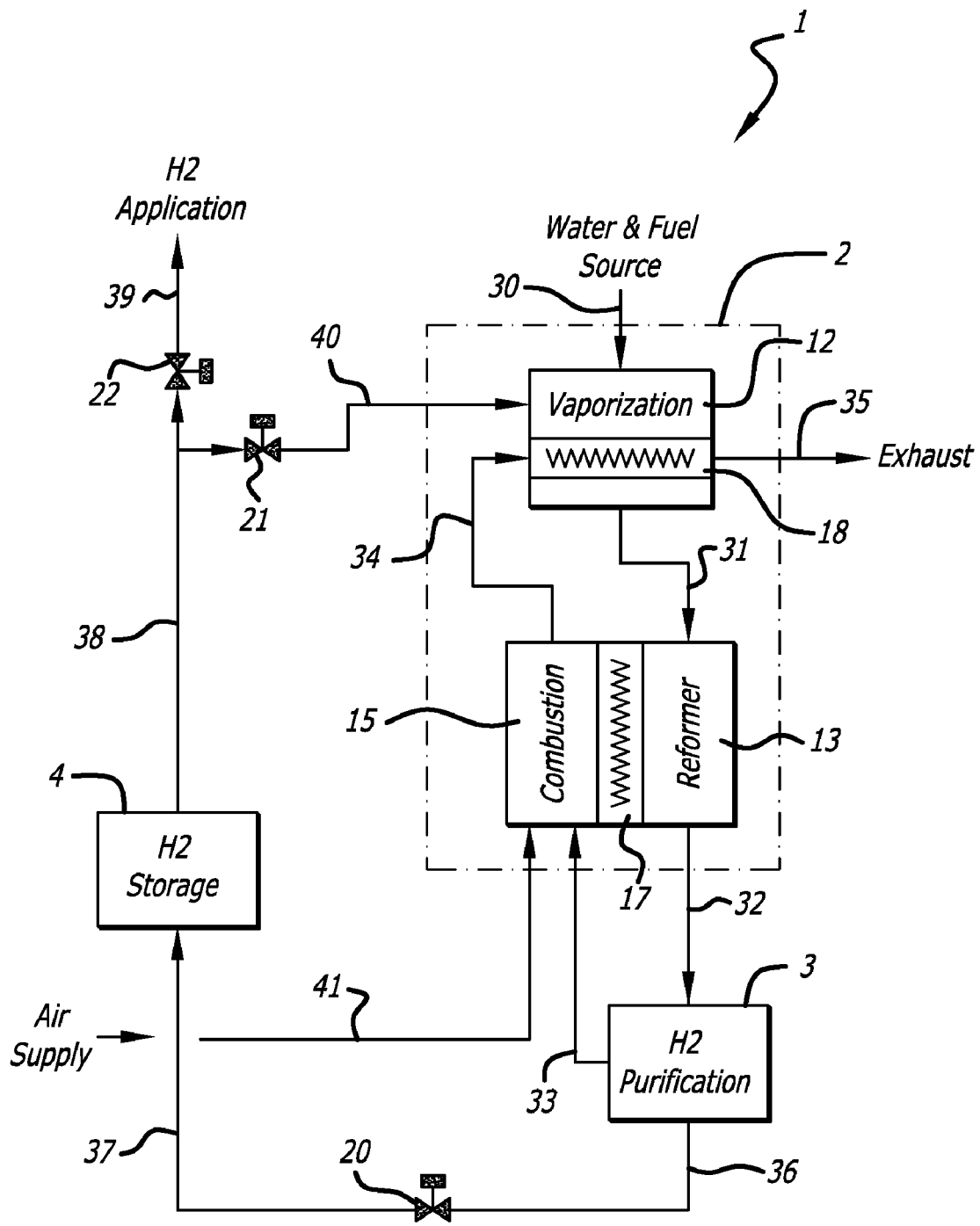
FIG. 1 shows a diagram illustrating in a schematic one embodiment of the hydrogen generation and purification system in accordance with the disclosure.

FIG. 1 shows a schematic representation of an exemplary embodiment of the system of this disclosure. The system 1 comprises a hydrogen generation system primarily consisting of a reformer unit 2, a hydrogen purification unit 3 and a hydrogen storage unit 4. The reformer unit consists of a reformer catalyst section 13, a combustion or combustor section 15, and a vaporizer section 12. The reformer catalyst section 13 is in thermal contact with the combustor section 15 through heat transfer surface 17. Vaporizer section 12 also has a heat exchanger surface 18.

During normal operation of the system 1, fuel and water 30 enter the reformer unit 2 and more specifically into the vaporizer section 12 where heat from combustion exhaust gases from the combustor section 15 passes through the heat exchange channels in the vaporizer section 12. Fuel and/or water 30 may or may not be pre-heated and pre-vaporized using other sources of heat prior to entering vaporizer section 12. This heat causes the liquid water and fuel to vaporize into a vaporized fuel/steam mixture before it passes through connection 31 and into the reformer catalysts section 13. The hot vaporized fuel/steam mixture enters the reformer catalyst section 13 and reacts on the catalyst in the reformer catalysts section 13 to form a hydrogen rich reformate gas stream that exits the catalyst section 13 through connection 32. This hydrogen rich reformate gas stream contains excess water vapor. The excess water vapor is condensed from the reformate gas in a condenser (not illustrated in schematic of FIG. 1), typically down to a dew point below 70° C. This partially dried reformate gas stream flows into the hydrogen purification unit 3 in which pure hydrogen gas is separated from the other gases in the reformate stream. The pure hydrogen gas passes through connection 36 and the other gases or off-gas stream separated from the pure hydrogen gas pass through connection 33 and exit the hydrogen purification unit 3.

The exiting off-gas stream still contains combustible species including some hydrogen. This off-gas stream flows to the combustor section 15 in the reformer unit 2 where it is mixed with oxygen (typically air) introduced through connection 41 to form a combustible mixture that reacts or combusts in the combustor section 15. This combustion generates heat that is transferred through heat exchange surface 17 to the reformer catalyst section 13 to provide the heat needed by the reformation catalytic reactions.

Warm combustion exhaust gas flows from the combustor section 15 through connection 34 to the heat exchanger 18 which is in thermal contact with the water and fuel mixture entering the vaporizer section 12 through connection 30. After releasing its thermal energy the combustion exhaust gas passing through the heat exchanger 18 exits the system through exhaust connection 35.

At the same time, the pure hydrogen stream from the hydrogen purification unit 3 passes through connection 36 and valve 20, and through connection 37 enters the hydrogen storage unit 4 where it is stored. Hydrogen may then be drawn from the storage unit 4 through the connections 38 and 39 via valve 22 to the external application where it is used. Startup valve 21 is closed during normal operation. Isolation valves 20 and 22 are open to flow during normal operation.

During normal operation the control of temperatures, temperature profiles, pressures, water to fuel ratios, and other parameters maintains stable operation of the reforming process. This implies that desired reactions such as the conversion of liquid hydrocarbon fuels (—$CH_2$-)n, where n represents the length of the typical hydrocarbon chain, and/or methane ($CH_4$) are promoted by the temperatures, pressures, composition mixtures, and catalyst environments within the reformer. In general the desired steam reactions for hydrocarbon type fuels are the following:

$$CH_4 + H_2O \leftrightarrow CO + 3H_2$$

$$CH_4 + 2H_2O \leftrightarrow CO_2 + 4H_2$$

$$CO + H_2O \leftrightarrow CO_2 + H_2$$

$$(CH_2)n + (H_2O)n \leftrightarrow (CO)n + (2H_2)n$$

$$(CH_2)n + (2H_2O)n \leftrightarrow (CO_2)n + (3H_2)n$$

In general the undesired reactions for similar fuels are the following:

$$CH_4 \leftrightarrow C + 2H_2$$

$$2CO \leftrightarrow C + CO_2$$

$$(CH_2)n \leftrightarrow (C)n + (H_2)n$$

This is a very simplistic representation of the steam reforming equilibrium reactions which can involve much more complex interactions and step reactions, especially when processing complex commercial fuels such as natural gas, liquid petroleum gas, gasoline, kerosene, diesel, and others. Some of these fuels contain non-saturated hydrocarbons and aromatic compounds, whose double bonded carbons and complex ring structures can promote the formation of solid carbon.

In applications such as fuel cell systems and hydrogen refueling stations, hydrogen generation systems are required to be compact, low capacity, low capital cost, highly efficient, and water self-sufficient while being operated as transient load following units and potentially daily on/off cycles. These requirements dictate advanced approaches because many of the established industrial practice techniques discussed previously are not feasible. This is especially true during the start and stop cycles when normal operating temperature and process profiles are still being established.

The innovative system of the present disclosure facilitates a unique startup procedure that manages to achieve the requirements of compact hydrogen generation systems while minimizing the potential for carbon formation during startup, enhances heat transfer to the reactor, and supports catalyst reduction. The first feature of the system is that it incorporates a hydrogen purification unit 3 which is used to separate pure hydrogen that can be easily stored in unit 4 and an off-gas stream 33 which is used to fuel the combustor section 15.

Two types of hydrogen purification units 3 are considered most relevant for use in a compact hydrogen generation system such as system 1 shown in FIG. 1. The innovative system, however, is not limited by these concepts and this description is provided for illustrative purposes only. One exemplary purification unit is a pressure swing adsorption (PSA) unit in which pressurized reformate gas is passed over an adsorbent material such as zeolites, which show a preference to adsorb non-hydrogen gaseous species in the reformate stream. This allows the pure hydrogen product gas to be isolated and delivered from the unit at near the pressure of the feed reformate. Typically, multiple adsorption beds are used such that one bed is operated in the adsorption mode at pressure, while the other bed is depressurized allowing the adsorbed species to desorb creating the off-gas stream, which exits the hydrogen purification unit at low pressure (near ambient). PSA units can be constructed in many different configurations.

One specific configuration uses rotary valves at both ends of tubes filled with adsorbent materials. The tube array can have almost any number of tubes, but typically have four, six, eight, or more. Each valve has several complex flow paths which connect the end of each tube to another tube in the array, to produce tank/flow connection, the feed connection, and/or the off-gas connection. As the valve rotates, the tubes in the array are sequenced through optimized pressurization and depressurization cycles. The mass flow through the unit and relative flow between the product flow connection and the off-gas flow connection can be controlled by the feed flow/pressure, speed of rotation and internal orifices settings within the PSA. The advantage of this type of PSA is that it can be operated at various feed flow rates, feed pressures, and cycle speeds to achieve variations in the system backpressure, hydrogen recovery, and therefore, the relative flow between the product and off-gas flow connections.

A second example of a hydrogen purification unit is a hydrogen separation membrane ($H_2$ Membrane) unit. In this unit the pressurized reformate stream is passed on one side of a membrane (such as a palladium alloy) and hydrogen molecules selectively transfer through the membrane creating a low pressure (near ambient) pure hydrogen stream and a pressurized off-gas stream consisting of the gases that did not transfer through the membrane. A critical difference between these two examples of hydrogen purification units is that, in the PSA unit, the product $H_2$ is produced at high pressure while in the $H_2$ Membrane unit, the product $H_2$ is at a low pressure. Depending on the particular hydrogen storage unit 4 being used, the product hydrogen stream from an $H_2$ Membrane unit may need to be compressed for storage.

The second feature of the system 1 is that the hydrogen generation system 1 incorporates an hydrogen storage unit 4 which has been sized to at least provide sufficient hydrogen to fuel the combustor section 15 during the startup transient period in which proper temperature profiles are still being established within the reformer catalyst section 13 and such that process fuel can be reformed and used to drive the combustion process. Several types of hydrogen storage units are considered relevant to compact hydrogen generation systems 1. The innovative concept is not limited by these concepts and any description is provided for illustrative purposes only. One type is metal hydride (MH) storage in which fine particles of a specific metal alloy, such as $AB_5$ or Mm-Ni—Mn—Co alloy systems, are contained in a vessel. Hydrogen dissolves and is absorbed within the metal alloy matrix and reaches an equilibrium concentration based on its temperature and pressure. Although relatively heavy, an advantage of MH storage in units is their ability to store large amounts of hydrogen in a limited volume and at pressures of only a few to 10 Bar. Typically MH storage units can achieve storage ratios of 300 to 450 volumes $H_2$/volume of vessel.

A second option is to store hydrogen at high pressures (100 to 700 Bar) to reduce the volume and mass of the storage unit. This typically requires the compression of product hydrogen from the $H_2$ purification unit 3, which in turn results in high parasitic power consumption in comparison to the first option. A third alternative is to use low pressure volume storage which may result in excessively large volumes but can have cost advantages in some applications.

The innovative system configuration includes hydrogen generation systems 1 that incorporate a fuel reformer 2, hydrogen purification unit 3, and hydrogen storage unit 4. One preferred embodiment of the disclosure includes a hydrogen generation system 1 that incorporates an MH hydrogen storage unit 4 and PSA hydrogen purification units 3. This embodiment provides process and system size advantages which are important in compact hydrogen generation systems for fuel cell and hydrogen refueling station applications. The selection of the PSA for the hydrogen purification unit 3 supports operating the reformer's catalyst section a pressure (under 15 Bar(g)) and preferable in the 5 to 10 Bar(g) range and delivery of the product hydrogen to the $H_2$ storage unit 4 at near the operating pressure of the reformer catalyst section 13. The MH storage unit 4 provides compact and efficient storage without requiring compression of the product hydrogen above the delivery pressure from the $H_2$ purification unit 3.

One preferred embodiment of the system 1 provides a connection 40 between the $H_2$ storage unit 4 and the reformer assembly 2. During startup, stored $H_2$ flows through the reformer 2 before being passed to the combustor section 15 where it is reacted with oxygen (typically from air) to generate heat to warm up the reformer 2. In this startup mode, the hydrogen first flows through the vaporizer 12, the reformer 13, the purification unit 3 and through connection 33 to the combustor section 15 where it is mixed with air via connection 41 so as to combust to produce heat in both the reformer heat transfer surface 17 and the heat transfer surface 18 in the vaporizer section 12. Once normal operational parameters are achieved, the valve 21 is shut and hydrogen "assist" is no longer needed.

Another embodiment of the disclosure may provide a direct connection 40 between the $H_2$ storage unit 4 and the reformer assembly 2 such that during startup stored $H_2$ flows only through the reformer catalyst section 13 before being passed to the combustor section 15 where it is reacted with oxygen (typically from air) to generate heat to warm up the reformer 2.

Another embodiment of the disclosure may solely provide a direct connection 40 between the $H_2$ storage unit 4 and the reformer assembly 2 such that during startup stored $H_2$ flows through the vaporization section 12 and the reformer catalyst section 13 before being passed to the combustor section 15 where it is reacted with oxygen (typically from air) to generate heat to warm up the reformer 2.

One preferred embodiment of the disclosure provides a direct connection 40 between the $H_2$ storage unit 4 and the reformer assembly 2 such that during startup stored $H_2$ flows through the reformer 2 before being passed to the $H_2$ purification unit 3 and then passed to the combustor section 15 where it is reacted with oxygen (typically from air) to generate heat to warm up the reformer 2.

Each of these embodiments of the disclosure provide for increased hydrogen concentration within the reformer's catalyst section 13 during the critical startup stages when the flow of fuel begins and temperature profiles are not fully established. Increasing the $H_2$ concentration in the gas phases uniquely improves the equilibrium of the desired reactions and decreases the equilibrium of the undesired reactions. Hydrogen also prevents carbon formation pathways when the feed fuel contains non-saturated hydrocarbons and aromatics, because the hydrogen can react with the carbon-carbon double bonds.

The flow of hydrogen through the reformer 13 also serves as a thermal energy carrier helping to provide convective heat transfer and distribution throughout the vaporizer and reformer catalyst sections 12 and 13. The thermal conductivity of hydrogen is much greater that steam or other gaseous carrier fluids. The mass flow of hydrogen through the vaporization section 12 also supports the transport of water vapor throughout the catalyst sections and helps minimize condensation on surfaces before temperature profiles are established throughout the reformer. The flow of hydrogen gas along with water vapor supports proper flow of fluids through the water management sections. Finally, the flow of hydrogen through the reforming and WGS catalysts will support activation or conditioning of the catalyst prior to operation.

An innovative startup procedure is also defined in combination with the innovative system configuration of FIG. 1. The procedure shown in FIGS. 2 and 3 begins from a normal stop condition in which the hydrogen generation system is at ambient temperature and pressure. The hydrogen storage unit 4 is full from a previous run. Representative isolation valves 20, 21, and 22 are closed and no process fluids are flowing. In general the startup procedure involves the following four stages:

Stage 1: Light off—Stored $H_2$ from unit 4 and air 41 are used to generate heat in the combustor section 15 of the reformer 2 and the heat is transferred to both the reformer catalyst section 13 and the vaporizer section 12. The $H_2$ flows through the vaporization section 12, the reformer catalyst section 13, the $H_2$ purification unit 3 and through the off-gas connection 33 to the combustor section 15.

Stage 2: Warm up—Once appropriate temperatures are achieved in the vaporization section 12 and reformer section 13 process fluids, water or water and fuel, are initiated to generate reformate gas, which is also passed through the $H_2$ purification unit 3 to the off-gas connection 33 to the combustor section 15.

Stage 3: Pressurization—Once baseline temperature profiles are established in the vaporization section 12 and reformer catalyst section 13 and water and fuel are both flowing to the reformer 2, the operation of the $H_2$ purification unit 3 is adjusted to establish a back pressure on the reformer catalyst section 13 and vaporizer section 12, which in turn decreases the hydrogen flow from the $H_2$ storage unit 4 due to a decreased differential pressure.

Stage 4: Establish Normal Operation—Once the flow of $H_2$ from the storage unit 4 is minimized and purity of the product $H_2$ achieved by the $H_2$ purification unit 3 the hydrogen product gas is allowed to flow to and recharge the storage unit 4 and to the applications through connection 39.

Thus the startup procedure in a hydrogen generating system having a vaporization section and a catalyst reformer section connected to a hydrogen purification unit and a hydrogen storage unit comprises steps of generating heat in the vaporization section and reformer sections using stored hydrogen from the hydrogen storage unit, introducing water and fuel into the vaporization and reformer sections to generate reformate gas, establishing a back pressure on the reformer catalyst section and vaporizer sections to decrease hydrogen flow from the storage unit, and recharging the storage unit with hydrogen generated from the introduced water and fuel.

Figure 2:
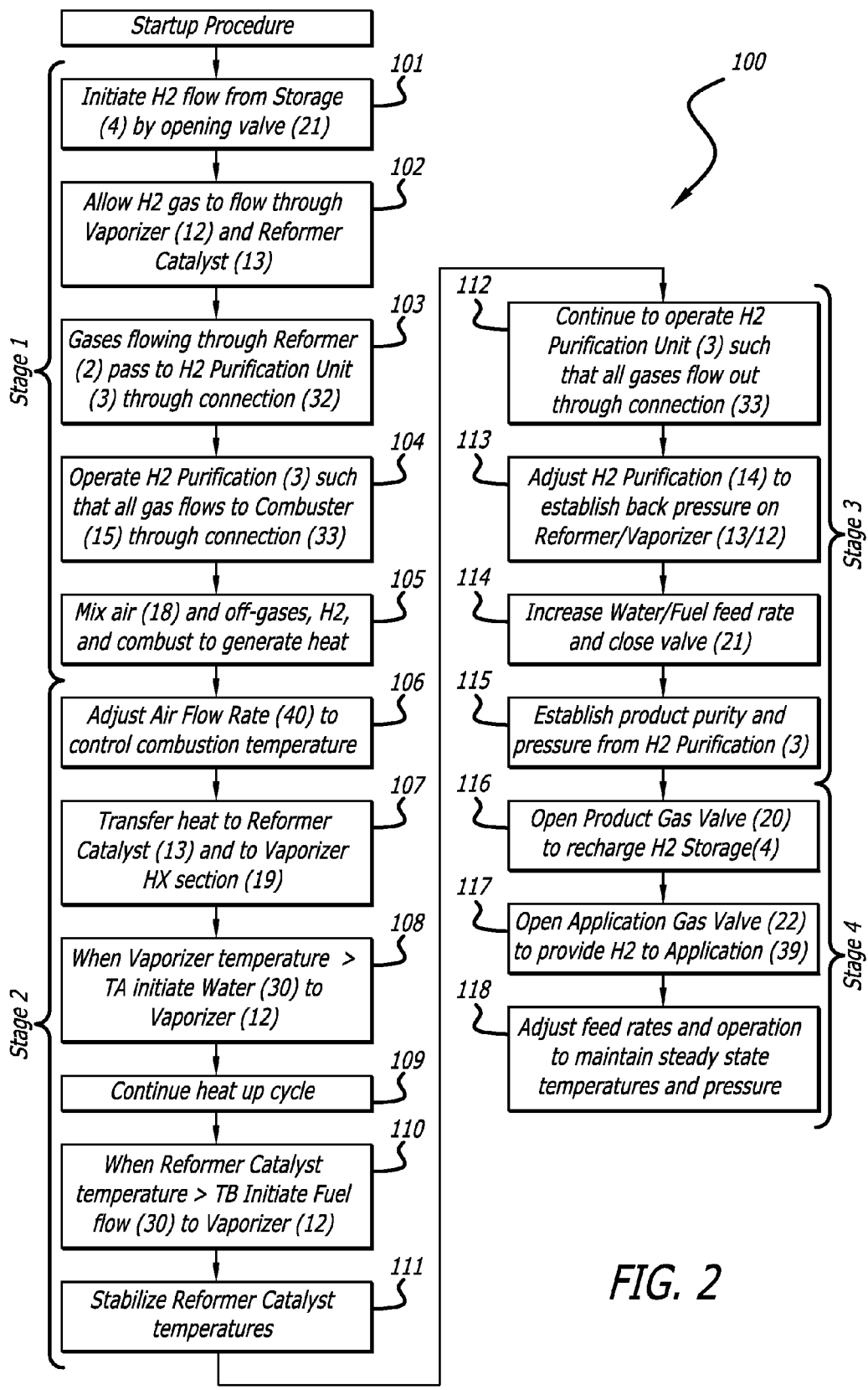
FIG. 2 is a flow diagram of one embodiment of the startup procedure in accordance with the disclosure for operating the system shown in FIG. 1.

FIG. 2 illustrates one embodiment of the innovative startup procedure 100. This innovative procedure 100 provides a more detailed description for the stages identified above. During the procedure the following steps are taken. This procedure is explained with the preferred embodiment of the system 1 that includes a PSA type $H_2$ purification unit 3 and a metal hydride storage unit 4. After this discussion, minor differences are explained for which other preferred embodiments of the system 2 are used.

Operational Step 101: Initiate $H_2$ flow from storage unit 4 by opening valve 21 that is placed between $H_2$ storage outlet connection 38 and startup hydrogen connection 40 between the unit 4 and the reformer 2. The pressure within the reformer 2 is low and near ambient pressure, while the $H_2$ pressure within the storage unit 4 is greater than ambient because it is in equilibrium with the amount of hydrogen stored within the unit 4 and its temperature. The pressure difference supports the flow of hydrogen gas through connection 40 and into the reformer 2.

Operational Step 102: The hydrogen gas flows through the reformer 2 passing through the reform catalyst section 13, alternatively through the vaporization section 12 and the reform catalysts section 13. This provides a hydrogen rich environment for the catalyst section 13 during startup. Maintaining an $H_2$ rich environment while baseline temperature profiles are being established minimizes the potential for carbon formation once fuel is introduced into the catalyst section 13 and vaporizer section 12 and enhances heat transfer.

Operational Step 103: The hydrogen gas flows out of the reformer 2, through connection 32 and into the $H_2$ purification unit 3.

Operational Step 104: The $H_2$ purification unit 3 is operated such as to promote all of the gas flow to exit the unit through off gas connection 33. The operation includes relatively fast cycle times for the $H_2$ purification unit and the maintaining valve 20 closed.

Operational Step 105: The off-gas stream 33, which is initially $H_2$ from storage, is mixed with air from its source flowing through connection 41 and combusted to generate heat in the combustor section 15 of reformer 2. This combustion can be catalytic combustion on the surfaces or gas phase combustion using an ignition source. The preferred embodiment used catalytic combustion but the concept is not limited to catalytic combustion.

Operational Step 106: The air flow rate through connection 41 is adjusted to control the overall combustion temperature and temperature gradients within the reformer 2.

Operational Step 107: The heat generated by combustion is transferred through the heat exchanger surface 17 to preheat the reformer catalysts 13 and the hydrogen gas flowing through it. The warm to hot exhaust from the combustor section 15 flows through connection 34 and into the heat exchanger 18 positioned within the vaporizer section 12. Heat is transferred through surfaces 18 and raises the temperature of the vaporizer section 12 and the gas flowing through it.

Operational Step 108: The heat up cycle defined in step 107 is continued and when the vaporizer temperature reaches an initial minimal temperature "TA" water flow through connection 30 is started. The minimal temperature "TA" is typically between 100 C and 200 C, such that liquid water is converted to vaporized water or steam, which mixes with the $H_2$ gas flowing from connection 40 to create a humidified hydrogen stream. The temperature should be sufficient to ensure that all the water is vaporized and not too high to create thermal shock due to rapid cooling when liquid water hits the surfaces of heat exchanger 18.

Operational Step 109: The heat up cycle is continued. Water flow rate through connection 30 is increased to help manage and balance the heat transfer and distribution throughout the catalyst section 13. Operation of the $H_2$ purification unit 3 is managed to minimize backpressure on the gas flowing through connection 32. Based on the structural characteristics of the reformer 2 assembly this heat up cycle can be as short as a few minutes to as long as an hour or so. Typical heat up cycles targeted between 10 and 45 minutes.

Operational Step 110: Once the catalyst section temperature is above "TBc" and the vaporization section temperature above "TBv" fuel flow can be initiated through connection 30 in parallel with the water flow. The water flow rate is increased as necessary to maintain a steam to carbon ratio of 3.0 and above and typically during the early steps the steam to carbon ratio should be maintained above 5.0 or until stable temperature profiles are achieved. The minimum vaporization temperature is dependent on the type of fuel and should be sufficient to ensure that all of the fuel fed to the reformer 2 is fully vaporized within the vaporization section 12. With liquid hydrocarbon fuels, such as kerosene or gasoline, this can be between 300 and 500 C depending on the specific vaporization characteristic of the fuel. With gaseous fuels, such as natural gas or dimethylether, this temperature can be relatively low in the 200 to 300 C range. One consideration with gaseous fuels is that the combustion surface temperatures are sufficiently high to effectively burn the fuel. The minimum catalyst section 13 temperature is typically between 600 and 850 C and should be sufficient to achieve fuel reforming reactions that convert the vaporized fuel into reformate stream. Maintaining the $H_2$ rich environment due to $H_2$ flow through connection 40, steam to carbon ratios above 5.0 and sufficient temperature within both the vaporization section 12 and the catalyst section 13 are critical features that prevent or minimize carbon formation within the reformer 2 when fuel flow is initiated. These features are preferred embodiments of the system 1 configuration and the startup procedure.

Operational Step 111: As fuel begins to flow through the catalyst section 13 and react with steam to form a reformate stream, the temperature profiles within the catalyst bed 13 will shift due to the endothermic reforming reactions. The reformate stream will mix with the startup hydrogen also flowing through the reformer and this mixture will flow out of the reformer 2 through connection 32.

Operational Step 112: The operation of the $H_2$ purification unit 3 will be maintained to exhaust all of the inlet flow through connection 33 and to the combustor section 15. The combustor temperature will begin to rise due to the increased energy content of the off-gas stream. Air flow through connection 41 into the combustor section 15 is adjusted to maintain proper combustor temperature. The process will be adjusted (water flow, fuel flow, and air flow rates) to stabilize the reformer catalyst temperatures.

Step Operational 113: The operation of the $H_2$ purification unit 3 will be adjusted typically this is to slow down the cycle time or rotation speed. The adjustment will begin to establish a backpressure on the inlet flow stream through connection 32 which will in turn increase the pressure within the catalyst section 13 and the vaporizer section 12. This increased pressure within the reformer 2 will cause the amount of $H_2$ gas flowing through connection 40 to also decrease because the pressure driving force has decreased. With this decreased $H_2$ flow the energy content of the off-gas stream also decreases and air flow rate is adjusted to maintain target operating temperatures.

Operational Step 114: The water and fuel flow rates are increased to increase the reformate flow and the $H_2$ purification unit 3 cycle speed is adjusted to continue to increase the back pressure to the point where minimal hydrogen gas is flowing from storage. At this point the isolation valve 21 is closed to stop all hydrogen flow through connection 40. The process at this point is fueled 100% by the reformate gas.

Operational Step 115: The $H_2$ purification unit 3 operation is adjusted to establish both nominal product purity and pressure.

Operational Step 116: Once product hydrogen purity is achieved isolation valve 20 can be opened to allow product flow through connection 36 and 37 from the purification unit 3 and into the $H_2$ storage unit 4 in which hydrogen is stored to replace the gas used during the initial steps of the startup process. The inlet water and fuel flow rates through connection 30 are increased to compensate for the amount of hydrogen delivered through the product connection 36.

Operational Step 117: In parallel with recharging the hydrogen storage unit 4 isolation valve 22 can be opened to also allow product hydrogen to flow to the $H_2$ application through connection 39.

Operational Step 118: The feed rates of water and fuel are adjusted and the operation of the $H_2$ purification unit 3 is adjusted to achieve a steady state operating profile and reformer catalyst 13 temperature profile. At this point the system 1 is considered to be in its normal operating mode.

This startup procedure 100 provides several innovative features that result in benefits to the overall system and minimized the potential for carbon formation during startup. First the connection 40 and isolation valve 21 provide a means to provide hydrogen gas to the catalytic combustor 15 which in turn allows the reformer unit 2 to be started without a spark ignition. Catalytic combustion of hydrogen supports a controlled and gradual heat up cycle that helps to maintain appropriate temperature gradients within the catalyst bed 13. Appropriate temperature gradients are temperature gradients of no more than 300 to 400 C across the bed at any time and ones in which the maximum temperature is toward the process outlet side of the catalyst bed 13. When hydrogen is not available for startup the primary fuel source is typically used and a spark igniter is typically required. If the fuel is a liquid fuel such as gasoline, diesel, etc., direct combustion of the liquid can often result in carbon formation because of mixing issues and often a dedicated startup burner is needed to provide a low capacity direct flame which can then be used to ignite a larger fuel mixture needed to minimize startup time. In contrast, hydrogen fueled startups do not require additional equipment or hardware and can proceed at a rate limited only be the mechanical design of the reformer system hardware.

Secondly, the use of hydrogen gas in process 100 as a thermal transport medium within the catalyst bed 13 helps provide the distribution of heat and helps to maintain a more uniform temperature profile such that the potential for hot spots are minimized. The hydrogen gas is a thermal transport medium because it flows through the reformer's 2 catalyst and vaporization sections 12 and 13 prior to being directed to the combustor section. Hydrogen has a much greater thermal conductivity and thermal capacity than pure steam which is the conventional fluid used for this function during startup.

Thirdly, the use of hydrogen as a purge gas through the catalyst section 13 and/or the catalyst section 13 and the vaporizer section 12 in the process 100 provides a non-condensable gas medium in which the initial water vapor generated in the vaporizer section 12 can be mixed minimizing the potential for condensation as the catalyst section 13 is raised in temperature during startup. The non-condensable gas supports the normal operation of the water recovery sections (not shown) because as water is condensed to prevent liquid water from entering the $H_2$ Purification unit 3 the non-condensable hydrogen gas is still flowing through the $H_2$ purification unit 3. This gas flow helps to maintain pressure balances and normal cyclic operation.

A fourth advantage of this procedure 100 is that the catalyst section 13 and/or vaporizer section 12 and the catalyst section 13 are always maintained with a high hydrogen partial pressure, which helps to prevent the formation of carbon during startup when baseline temperature profiles have not been fully established and fuel flow is initiated. The hydrogen helps to eliminate carbon-carbon double bonds located in unsaturated hydrocarbons and aromatic compounds.

A fifth advantage of this procedure 100 is that the catalyst section 13 may require activation or exposure to hydrogen for conditioning the catalyst before operation. The procedure achieves this in parallel without a dedicated conditioning or activation step.

Figure 3:
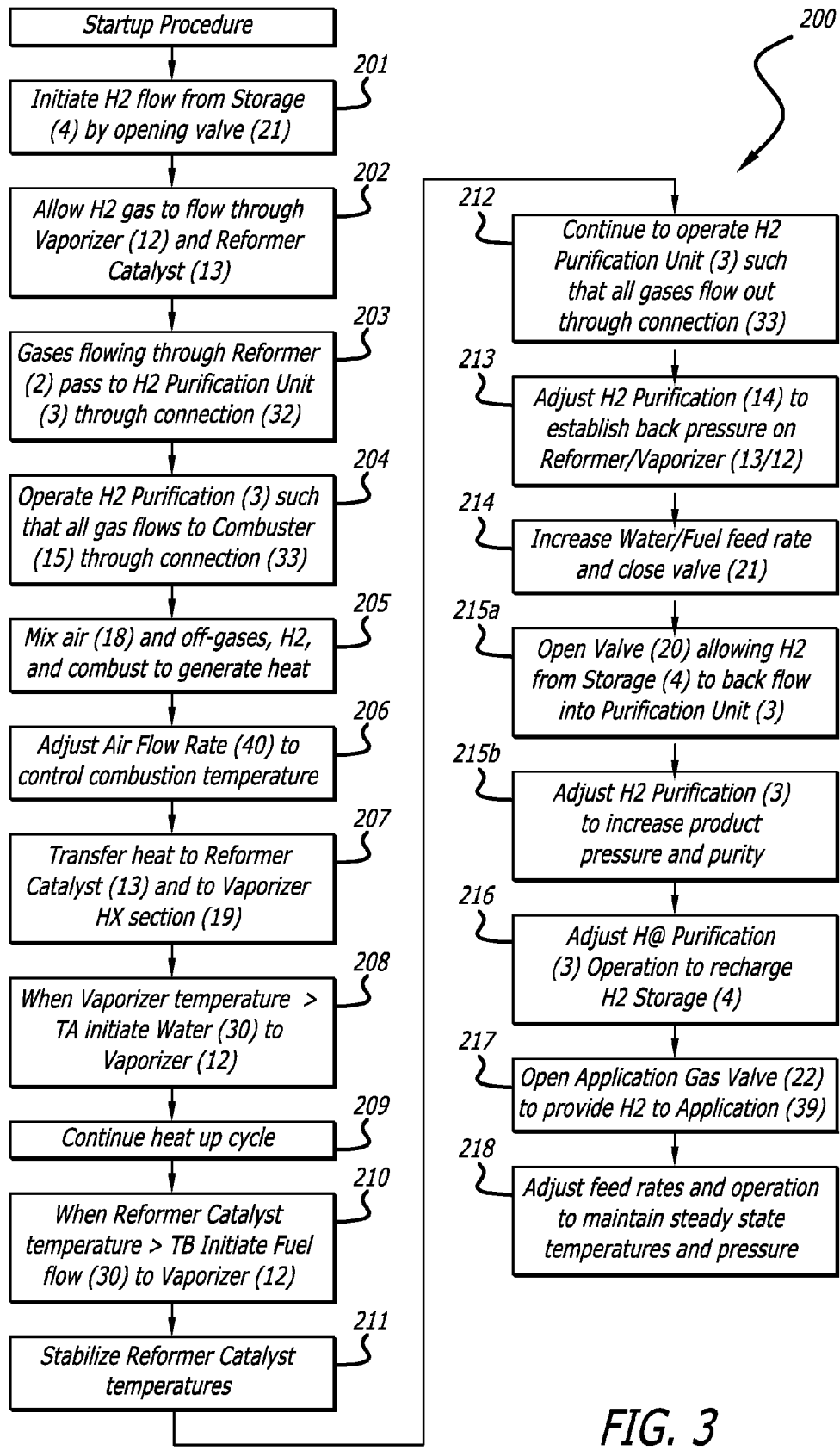
FIG. 3 is a flow diagram of another embodiment of the startup procedure in accordance with the disclosure for operating the system shown in FIG. 1.

An alternative embodiment of the startup procedure 200 is identified in FIG. 3. The procedure 200 is the same as steps 101 of procedure 100 up to step 114. Specifically:

Operational Step 201: Initiate $H_2$ flow from storage unit 4 by opening valve 21 that is placed between $H_2$ storage outlet connection 38 and startup hydrogen connection 40 between the unit 4 and the reformer 2. The pressure within the reformer 2 is low and near ambient pressure, while the $H_2$ pressure within the storage unit 4 is greater than ambient because it is in equilibrium with the amount of hydrogen stored within the unit 4 and its temperature. The pressure difference supports the flow of hydrogen gas through connection 40 and into the reformer 2.

Operational Step 202: The hydrogen gas flows through the reformer 2 passing through the reform catalyst section 13, alternatively through the vaporization section 12 and the reform catalysts section 13. This provides a hydrogen rich environment for the catalyst section 13 during startup. Maintaining a $H_2$ rich environment while baseline temperature profiles are being established minimizes the potential for carbon formation once fuel is introduced into the catalyst section 13 and vaporizer section 12.

Operational Step 203: The hydrogen gas flows out of the reformer 2, through connection 32 and into the $H_2$ purification unit 3.

Operational Step 204: The $H_2$ purification unit 3 is operated such as to promote all of the gas flow to exit the unit through off gas connection 33. The operation includes relatively fast cycle times for the $H_2$ purification unit and the maintaining valve 20 closed.

Operational Step 205: The off-gas stream 33, which is initially $H_2$ from storage, is mixed with air from its source flowing through connection 41 and combusted to generate heat in the combustor section 15 of reformer 2. This combustion can be catalytic combustion on the surfaces or gas phase combustion using an ignition source. The preferred embodiment used catalytic combustion but the concept is not limited to catalytic combustion.

Operational Step 206: The air flow rate through connection 41 is adjusted to control the overall combustion temperature and temperature gradients within the reformer 2.

Operational Step 207: The heat generated by combustion is transferred through the heat exchanger surface 17 to preheat the reformer catalysts 13 and the hydrogen gas flowing through it. The warm to hot exhaust from the combustor section 15 flows through connection 34 and into the heat exchanger 18 positioned within the vaporizer section 12. Heat is transferred through surfaces 18 and raises the temperature of the vaporizer section 12 and the gas flowing through it.

Operational Step 208: The heat up cycle defined in step 7 is continued and when the vaporizer temperature reaches an initial minimal temperature "TA" water flow through connection 30 is started. The minimal temperature "TA" is typically between 100 C and 200 C, such that liquid water is converted to vaporized water or steam, which mixes with the $H_2$ gas flowing from connection 40 to create a humidified hydrogen stream. The temperature should be sufficient to ensure that all the water is vaporized and not too high to create thermal shock due to rapid cooling when liquid water hits the surfaces of the heat exchanger 18.

Operational Step 209: The heat up cycle is continued. Water flow rate through connection 30 is increased to help manage and balance the heat transfer and distribution throughout the catalyst section 13. Operation of the $H_2$ purification unit 3 is managed to minimize backpressure on the gas flowing through connection 32. Based on the structural characteristics of the reformer 2 assembly this heat up cycle can be as short as a few minutes to as long as an hour or so. Typical heat up cycles targeted between 10 and 45 minutes.

Operational Step 210: Once the catalyst section temperature is above "TBc" and the vaporization section temperature above "TBv" fuel flow can be initiated through connection 30 in parallel with the water flow. The water flow rate is increased as necessary to maintain a steam to carbon ratio of 3.0 and above and typically during the early steps the steam to carbon ratio should be maintained above 5.0 or until stable temperature profiles are achieved. The minimum vaporization temperature is dependent on the type of fuel and should be sufficient to ensure that all of the fuel fed to the reformer 2 is fully vaporized within the vaporization section 12. With liquid hydrocarbon fuels, such as kerosene or gasoline, this can be between 300 and 500 C depending on the specific vaporization characteristic of the fuel. With gaseous fuels, such as natural gas or dimethylether, this temperature can be relatively low in the 200 to 300 C range. One consideration with gaseous fuels is that the combustion surface temperatures are sufficiently high to effectively burn the fuel. The minimum catalysts section 13 temperature is typically between 600 and 850 C and should be sufficient to achieve fuel reforming reactions that convert the vaporized fuel into reformate stream. Maintaining the $H_2$ rich environment due to $H_2$ flow through connection 40, steam to carbon ratios above 5.0 and sufficient temperature within both the vaporization section 12 and the catalyst section 13 are critical features that prevent or minimize carbon formation within the reformer 2 when fuel flow is initiated. These features are preferred embodiments of the system 1 configuration and the startup procedure.

Operational Step 211: As fuel begins to flow through the catalyst section 13 and react with steam to form a reformate stream, the temperature profiles within the catalyst bed 13 will shift due to the endothermic reforming reactions. The reformate stream will mix with the startup hydrogen also flowing through the reformer and this mixture will flow out of the reformer 2 through connection 32.

Operational Step 212: The operation of the H$_2$ purification unit 3 will be maintained to exhaust all of the inlet flow through connection 33 and to the combustor section 15. The combustor temperature will begin to rise due to the increased energy content of the off gas stream. Air flow through connection 41 into the combustor section 15 will increase to maintain combustor temperature. The process will be adjusted (water flow, fuel flow, and air flow rates) to stabilize the reformer catalyst temperatures.

Operational Step 213: The operation of the H$_2$ purification unit 3 will be adjusted typically this is to slow down the cycle time or rotation speed. The adjustment will begin to establish a backpressure on the inlet flow stream through connection 32 which will in turn increase the pressure within the catalyst section 13 and the vaporizer section 12. This increased pressure within the reformer 2 will cause the amount of H$_2$ gas flowing through connection 40 to also decrease because the pressure driving force has decreased. With this decreased H$_2$ flow the energy content of the off-gas stream also decreases and air flow rate is adjusted to maintain target operating temperatures.

Operational Step 214: The water and fuel flow rates are increased to increase the reformate flow and the H$_2$ purification unit 3 cycle speed is adjusted to continue to increase the back pressure to the point where minimal hydrogen gas is flowing from storage. At this point the isolation valve 21 is closed to stop all hydrogen flow through connection 40. The process at this point is fueled 100% by the reformate gas. However, in operational step 214 in procedure 200 the H$_2$ purification unit 3 operation is adjusted such that the established back pressure on the upstream catalyst section 13 and vaporizer section 12 is slightly lower than the H$_2$ pressure in storage unit 4.

Operational Step 215a: In step 215a the isolation valve 20 is opened which allows pure hydrogen from storage unit 4 to back flow into the pure hydrogen gas side of the purification unit 3. This hydrogen flow pushes any non-pure product gas in the H$_2$ purification unit back and into the off-gas side or connection 33. In operational step 215b the operation of the H$_2$ purification unit 3 is again adjusted to achieve product purity from unit 3.

Operational Step 216: Once product hydrogen purity is achieved H$_2$ purification unit 3 is adjusted to increase pressure in line 36 and since isolation valve 20 is opened product flow from H$_2$ purification unit 3 can flow through connection 36 and 37 and into the H$_2$ storage unit 4 in which hydrogen is stored to replace the gas used during the initial steps of the startup process. The inlet water and fuel flow rates through connection 30 are increased to compensate for the amount of hydrogen delivered through the product connection 36 and adjusted to increase the back pressure on the feed side connection 32 to a pressure greater than the hydrogen gas pressure in the storage unit 4 and to the point where pure hydrogen gas 36 begins to flow from the H$_2$ purification unit 3 to the H$_2$ storage unit 4.

Operational Step 217: In parallel with recharging the hydrogen storage unit 4 isolation valve 22 can be opened to also allow product hydrogen to flow to the H$_2$ application through connection 39.

Operational Step 218: The feed rates of water and fuel are adjusted and the operation of the H$_2$ purification unit 3 is adjusted to achieve a steady state operating profile and reformer catalyst 13 temperature profile. At this point the system 1 is considered to be in its normal operating mode.

The added advantage of this embodiment 200 is that the product hydrogen purity in the H$_2$ purification unit 3 is achieve faster because pure hydrogen from storage unit 4 is used to back flush the product side of the H$_2$ purification unit 3.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A hydrogen generation system (1) comprising:
   a fuel reformer (2) that includes:
      a vaporizer section (12) having an H$_2$ inlet connection (40), an inlet connection (30) for fuel and water from a source, a heat exchanger surface (18), and a vaporization section transfer passage (31), the vaporizer section being adapted to vaporize and pass a mixture of zero or more fuel and water, the vaporized mixture hereinafter being termed process gas, and zero or more H$_2$, in any relative concentration;
      a reformer catalyst section (13) having a catalytic reactor in fluid communication with the vaporization section transfer passage and a reformate gas transfer passage (32), adapted to reform at least a portion of input received from the vaporizer section that includes H$_2$ and off-gas, off-gas being defined as H$_2$, vaporized water, and vaporized fuel in any relative concentration, and output a reformate gas stream via the reformate gas transfer passage; and
      a combustor section (15) having connection to an off-gas transfer passage (33), having a combustion heat generator, and having a combustion product outlet (34), the combustor section being thermally coupled to the reformer catalyst section by a heat transfer surface (17) and fluidly coupled to the heat exchanger surface via the combustion product outlet;
   an H$_2$ purification unit (3) having a separator for H$_2$ and off-gas, having a purified H$_2$ outlet (36), and having connection to the off-gas transfer passage, wherein the H$_2$ purification unit is in fluid communication with the reformer via the reformate gas transfer passage and is adapted to output some portion of entering H$_2$ to the off-gas passage in an off-gas stream issuing therefrom;
   an H$_2$ storage unit (4) having an inlet (37) in fluid communication with the H$_2$ purification unit via the purified H$_2$ outlet and an outlet (38) in fluid communication with the vaporizer section via the H$_2$ inlet connection;
   and a startup valve (21) configured to open and an isolation valve (22) configured to close and selectively establish an H$_2$ recirculation path comprising, in order: the H$_2$ storage unit, the outlet (38), the H$_2$ inlet connection, the vaporizer section, the vaporization section transfer passage, the reformer catalyst section, the reformate gas transfer passage, the H$_2$ purification unit, the off-gas transfer passage, and then the combustor section.

2. The hydrogen generation system (1) of claim 1, wherein the system further comprises a first operational configuration adapted for normal running and a second operational configuration adapted for startup, wherein the first configuration is adapted to establish a pattern of temperatures consistent with vaporization of any water present in the reformer catalyst section and a pattern of gas pressures within the reformer catalyst section sufficient to inhibit inflow from the H$_2$ storage unit, and wherein the second configuration is adapted to disable inflow of unregenerated fuel.

3. The hydrogen generation system (1) of claim 1, wherein the vaporizer section further comprises:
   a third inlet adapted to receive (34) exhaust gases from the combust section; and
   a combustion exhaust connection (35);
   wherein the heat exchanger surface (18) is adapted to transfer sufficient heat from received exhaust gases from the combustor section to the received process gas and $H_2$ to elevate the received combination of process gas and $H_2$ to a vapor state.

4. The hydrogen generation system (1) of claim 1, wherein the reformer catalyst section further comprises a process inlet adapted to receive via a vaporization section transfer passage (31) a mixture of $H_2$ and vaporized process gas in any relative concentration.

5. The hydrogen generation system (1) of claim 1, wherein the combustor section further comprises:
   an inlet (41) for air from an air supply; and
   a combustible mixture former.

6. The hydrogen generation system (1) of claim 1, wherein the $H_2$ purification unit (3) further comprises:
   an $H_2$ purification unit cycle speed adjustment mechanism and a water and fuel flow rate mechanism jointly configurable to adjust back pressure on the vaporization section and reformer catalyst section outlets as functions of vaporization and reformer catalyst section baseline temperatures.

7. The hydrogen generation system (1) of claim 1, wherein the $H_2$ purification unit is selected from a group that includes a hydrogen separation membrane device and a pressure swing adsorption device.

* * * * *